United States Patent [19]

Wong et al.

[11] 4,053,105
[45] * Oct. 11, 1977

[54] THERMOSTATIC VALVE DEVICE HAVING NON-LINEAR FLOW CHARACTERISTICS

[75] Inventors: Backman Wong, Wayland; Earl L. Wilson, Wellesley, both of Mass.

[73] Assignee: Standard-Thomson Corporation, Waltham, Mass.

[*] Notice: The portion of the term of this patent subsequent to July 8, 1992, has been disclaimed.

[21] Appl. No.: 587,915

[22] Filed: June 18, 1975

Related U.S. Application Data

[63] Continuation-in-part of Ser. No. 384,519, Aug. 1, 1973, Pat. No. 3,893,618.

[51] Int. Cl.² ............................................ G05D 23/02
[52] U.S. Cl. ........................................................ 236/100
[58] Field of Search .......................... 236/34, 34.5, 100; 137/625.3; 251/118, 121, 205

[56] References Cited

U.S. PATENT DOCUMENTS

| | | | |
|---|---|---|---|
| 2,891,574 | 6/1959 | Dahlberg | 137/625.3 |
| 3,010,695 | 11/1961 | Banks | 251/205 |
| 3,087,676 | 4/1963 | Neher, Jr. et al. | 236/34 |
| 3,182,911 | 5/1965 | Drapeau | 236/34 |
| 3,575,342 | 4/1971 | Puster | 236/34 |
| 3,722,545 | 3/1973 | Furlani | 137/625.3 |
| 3,893,618 | 7/1975 | Wong et al. | 236/100 |

*Primary Examiner*—William E. Wayner
*Assistant Examiner*—William E. Tapolcai, Jr.
*Attorney, Agent, or Firm*—Jacox & Meckstroth

[57] ABSTRACT

A thermally responsive valve device having non-linear flow characteristics. The thermally responsive valve device includes movable and stationary valve structure. A movable valve member is movable to adjust the open area of a flow passage, but movement of the movable valve member provides a non-linear relationship between the area of the flow passage created and the distance of travel of the movable valve member. The movable and/or the stationary valve member is provided with an irregularly shaped portion so that with slight opening movement of the movable closure member less fluid flow than normal is permitted. As the movable valve member continues to move in an opening direction, the fluid flow increases at a predetermined non-linear rate until a specific flow rate is achieved. This operating characteristic eliminates or dramatically reduces temperature fluctuations in the system.

7 Claims, 20 Drawing Figures

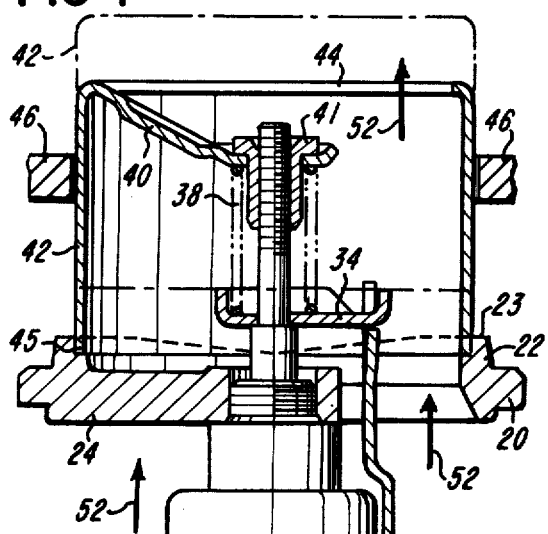
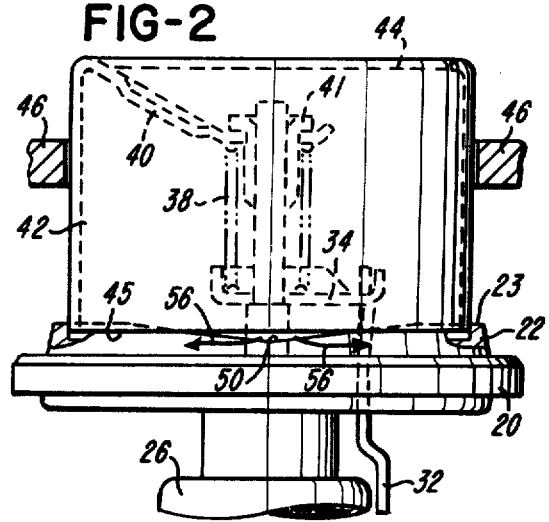
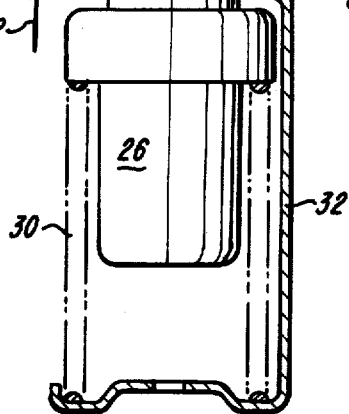
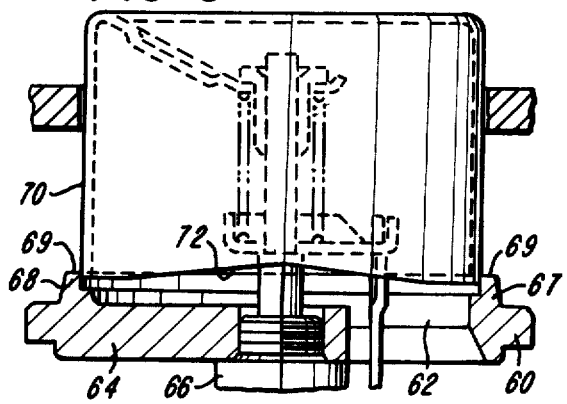
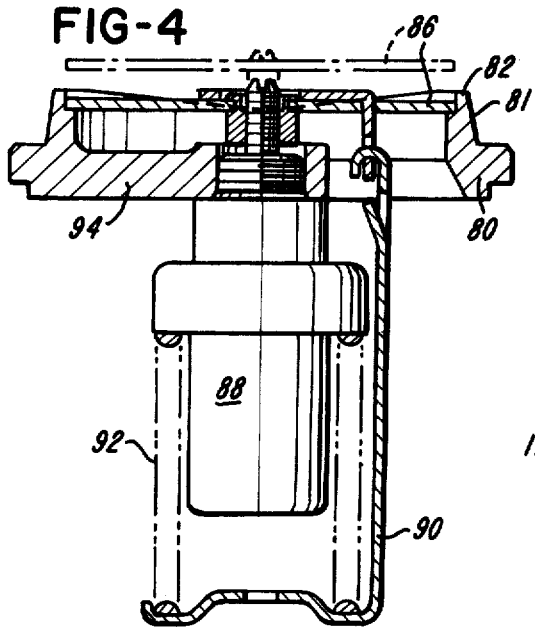
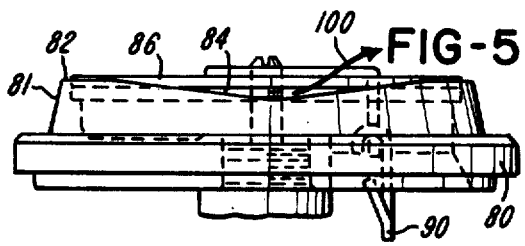
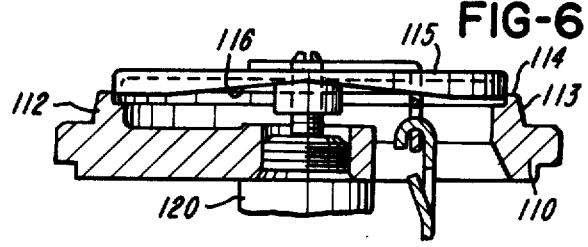

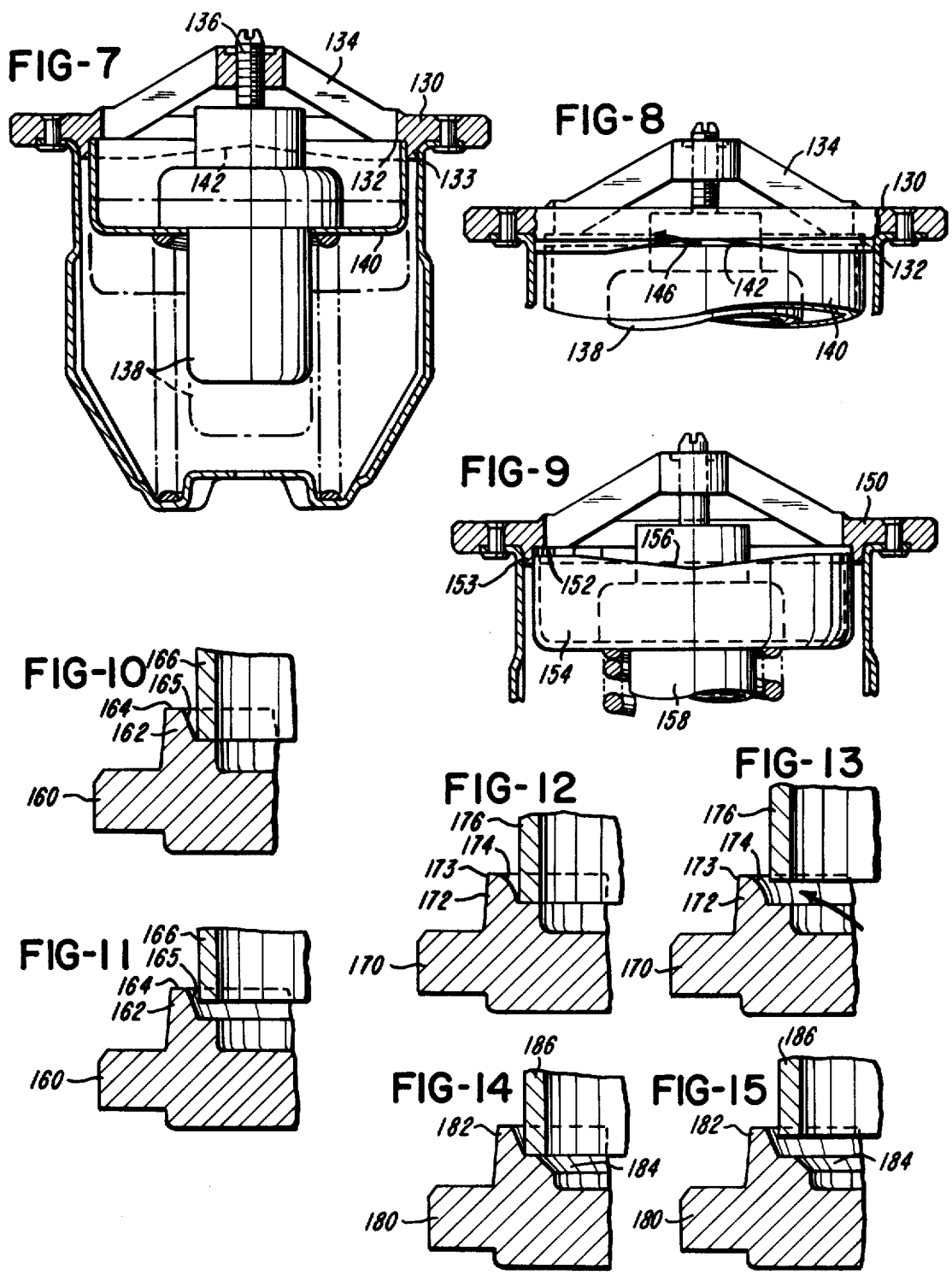

THERMOSTATIC VALVE DEVICE HAVING NON-LINEAR FLOW CHARACTERISTICS

RELATED APPLICATION

This application is a continuation-in-part of U.S. application Ser. No. 384,519, filed Aug. 1, 1973, now U.S. Pat. No. 3,893,618.

BACKGROUND OF THE INVENTION

Thermally responsive valve devices are employed as the principal temperature control means in engine cooling systems. It is well known in the art that existing thermostatic valve devices during initial opening operation permit the temperature of the system controlled to fluctuate. Such fluctuations are undesirable. In an attempt to solve this problem, some thermally responsive valve devices have included means for regulating fluid flow at low fluid rates. U.S. Pat. Nos. 2,926,853 and 3,182,911 disclose thermally responsive valve devices which have multiple closure members. However, such multiple closure members, even though providing fluid control, do not provide good metering or fine regulation of fluid flow, required for temperature control stability under dynamic operating conditions.

It is an object of this invention to provide a thermally responsive fluid valve device which has such excellent regulation of fluid flow.

Other objects and advantages of this invention reside in the construction of parts, the combination thereof, the method of manufacture, and the mode of operation, as will become more apparent from the following description.

BRIEF DESCRIPTION OF THE VIEWS OF THE DRAWINGS

FIG. 1 is a longitudinal sectional view of a thermally responsive valve device of this invention in which a movable valve member is movable to adjust the area of a flow passage and in which movement of the movable valve member provides a non-linear relationship between the area of the flow passage and the distance of travel of the movable valve member.

FIG. 2 is a fragmentary elevational view of the thermally responsive valve device of FIG. 1, showing the valve device in a slightly open position.

FIG. 3 is a fragmentary elevational view, with parts shown in section, of the valve portion of another thermally responsive valve device of this invention.

FIG. 4 is a longitudinal sectional view of another thermally responsive valve device of this invention.

FIG. 5 is a fragmentary elevational view of the valve portion of the device of FIG. 4, showing the valve device in a slightly open condition.

FIG. 6 is a fragmentary sectional view of the valve portion of another thermally responsive valve device of this invention.

FIG. 7 is a longitudinal sectional view of another thermally responsive valve device of this invention.

FIG. 8 is a fragmentary elevational view, with parts shown in section, of the valve portion of the device of FIG. 7, showing the valve device in slightly open condition.

FIG. 9 is a fragmentary perspective view, with parts shown in section, of the valve portion of another thermally responsive valve device of this invention, showing the valve elements in a slightly open condition.

FIG. 10 is a fragmentary sectional view showing a part of the valve portion of another thermally responsive valve device of this invention.

FIG. 11 is a fragmentary sectional view showing the valve portion of the thermally responsive valve device of FIG. 10, showing the valve elements in a slightly open condition.

FIG. 12 is a fragmentary sectional view showing a part of the valve portion of another thermally responsive valve device of this invention.

FIG. 13 is a fragmentary sectional view showing the valve portion of the thermally responsive valve device of FIG. 12, showing the valve portion in a slightly open condition.

FIG. 14 is a fragmentary sectional view showing a part of the valve portion of another thermally responsive valve device of this invention.

FIG. 15 is a fragmentary sectional view showing the valve portion of the thermally responsive valve device of FIG. 14, showing the valve portion in a slightly open condition.

DETAILED DESCRIPTION OF THE PREFERRED EMBODIMENTS

Figure 16:
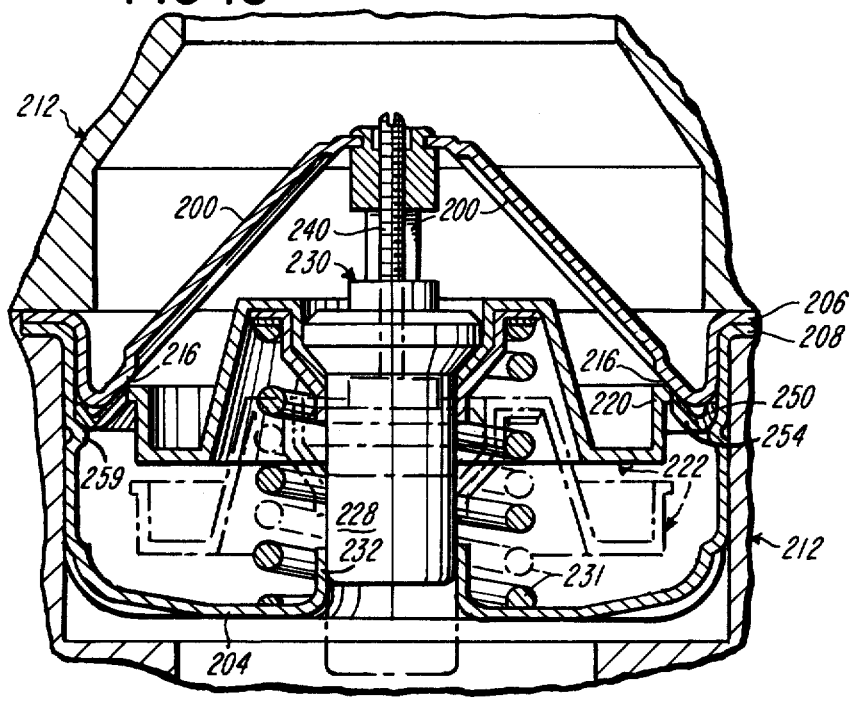
FIG. 16 is a longitudinal sectional view of another thermally responsive valve device of this invention.

FIGS. 1 and 2 show a thermally responsive valve device of this invention in which a stationary member 20 has an annular valve seat portion 22 forming a fluid port. The valve seat portion has an annular flange 23 forming a recess. The stationary member 20 has an arm 24 which supports a thermally responsive actuator member 26, which may be of any suitable type, such as, for example, the type shown in U.S. Pat. Nos. 2,806,375 and 2,806,376.

A helical spring 30 encompasses the actuator member 26 and joins the actuator member 26 to a connector member 32, which is engaged by the spring 30. The connector member 32 extends through the fluid port in the stationary member 20 and is joined by a link 34 to an actuator stem 36 of the actuator member 26. The link 34 is shown as encompassing the actuator stem 36 and is engaged by a helical spring 38 which encompasses the stem 36 and engages an arm 40 which is carried by the stem 36. The arm 40 engages a nut 41 which is attached to the stem 36. The arm 40 extends from the stem 36 and joins a movable valve member in the form of a cup 42 which has an open upper end 44 and an annular closure portion 45 at the lower part thereof. The cup 42 is slidably encompassed by a horizontal wall 46.

The closure portion 45 of the cup 42 normally seats within the recess formed by the flange 23 in the valve seat portion 22, as showin in FIG. 1. The upper edge of flange 23 of the valve seat portion 22 has downwardly inclined or tapered portions 50 at opposite parts thereof.

Operation

The thermally responsive valve device of FIGS. 1 and 2 is of the type referred to as a by-pass valve device. Normally fluid flow exists through the device from the bottom to the top, as illustrated by arrows 52 in FIG. 1. Thus, fluid flows from the device outwardly through the upper open end 44 of the cup 42, and the fluid discharges to a region above the horizontal wall 46.

Some of the fluid which flows upwardly through the valve device engages the thermally responsive actuator member 26. If the temperature of the fluid which engages the thermally responsive actuator member 26 is above a given predetermined temperature, the actuator stem 36 moves upwardly and moves the cup member 42 upwardly. Such movement is against the forces of the spring 30.

As the cup 42 moves upwardly, the closure portion 45 thereof slidably moves upwardly within the flange 23. Due to the fact that the upper edge of the flange 23 has downwardly tapered portions 50, the lower edge of the cup 42 first moves past the lowermost part of the downwardly tapered portions 50. Thus, a small opening is first created at the lowermost part of each of the downwardly tapered portions 50 at the upper edge of the flange 23, and fluid flows outwardly therefrom, as illustrated by arrows 56 in FIG. 2. As the cup 42 continues to move upwardly, the fluid passage provided at each of the downwardly inclined parts 50 becomes gradually greater, and greater fluid flow between the cup 42 and the valve seat portion 22 is permitted. The fluid flows outwardly from the valve device into the space between the stationary member 20 and the horizontal wall 46. Ordinarily, means are provided by which upward movement of the cup 42 closes a port immediately above the cup 42, so that following maximum movement of the cup 42 upwardly, all of the fluid flowing through the fluid port within the stationary member 20 flows outwardly between the stationary member 20 and the cup 42.

When the temperature of fluid which engages the actuator member 26 decreases, the actuator stem 36 and the cup 42 are moved downwardly by the spring 30.

FIG. 3

FIG. 3 shows another embodiment of the thermally responsive valve device of this invention. A stationary member 60 is provided with a fluid port 62. An arm 64 attaches a thermally responsive actuator member 66 to the stationary member 60. The stationary member 60 has a valve seat portion 67, provided with an annular flange 68. The flange 68 has an upper edge portion 69 which is straight or level. In a manner similar to that disclosed with respect to the embodiment of FIGS. 1 and 2, a cup member 70 is slidably positioned inside of the flange 68. The lower edge of the cup 70 is generally level but is provided with one or more upwardly inclined surfaces 72, which form one or more notches in the lower edge of the cup 70. Thus, as the actuator member 66 moves the cup 70 upwardly within the flanges 68, initial movement of the cup 70 upwardly creates a very small fluid passage in the notch formed by the surfaces 72. As the cup 70 continues to move upwardly, the fluid passage provided between the cup 70 and the upper edge 69 of the flange 68 gradually increases.

FIGS. 4 and 5

FIGS. 4 and 5 show another embodiment of the thermally responsive valve device of this invention. A stationary member 80 is provided with a valve seat portion 81 which has a flange 82 having an upper edge which is provided with one or more downwardly inclined surfaces or portions 84. A movable closure member 86 is adapted to seat within the valve seat portion 81 and within the flange 82 to prevent flow of fluid upwardly from the thermally responsive device. The closure member is attached to a thermally responsive actuator 88 by means of a connector member 90 and a spring 92. The thermally responsive actuator member 88 is attached to the stationary member 80 by means of an arm 94. Upon increase in temperature of fluid engaging the thermally responsive actuator 88, the movable closure member 86 is moved upwardly by the actuator 88. Fluid first flows through a small fluid passage which is provided between the movable closure member 86 and the lowermost part of the downwardly inclined surface or portion 84 at the upper edge of the flange 82, as illustrated by an arrow 100 in FIG. 5. As upward movement of the movable closure member 86 continues, a gradually increasing fluid passage is created.

FIG. 6

FIG. 6 shows another thermally responsive valve device of this invention. A stationary member 110 has a valve seat portion 112 provided with a flange 113 which has a level upper edge 114. A movable closure member 115 normally seats within the valve seat portion 112 and within the flange 113. The movable closure member 115 has a lower edge surface 116, a part of which is upwardly inclined. Thus, as a thermally responsive actuator member 120 moves the movable closure member 115 upwardly, as illustrated in FIG. 6, initial movement of the movable closure member 115 upwardly provides a very small fluid passage between the upper-most part of the lower edge surface 116 of the movable closure member 115 and the upper edge 114 of the valve seat portion 112.

FIGS. 7 and 8

FIGS. 7 and 8 show another embodiment of a thermally responsive valve device of this invention. The thermally responsive valve device in FIGS. 7 and 8 is provided with a stationary member 130 which has a lower portion thereof which is provided with an annular valve seat portion 132, within a flange 133. A bridge 134 extends slightly upwardly from the stationary member 130 and has attached thereto an actuator stem 136 of an actuator device 138. Attached to the actuator device 138 is a closure member 140. The lower edge surface of the valve seat portion 132 has an upwardly inclined portion 142. When the thermally responsive actuator 138 senses temperatures above a predetermined value, the thermally responsive actuator 138 moves downwardly and moves the closure member 140 downwardly. Initial movement of the valve closure member 140 downwardly creates a slight flow passage between the vertex of the inclined edge portion 142 of the valve seat portion 132 and the upper edge of the closure member 140 and fluid flows therefrom as illustrated by an arrow 146 in FIG. 8. Further downward movement of the closure member 140 creates a gradually increasing fluid flow passage between the valve seat portion 132 and the closure member 140, as illustrated in FIG. 8.

FIG. 9

FIG. 9 shows another embodiment of the thermally responsive valve device of this invention. A stationary member 150 is provided with a valve seat portion 152 having an annular flange 153. A closure member 154 normally seats within the valve seat portion 152 and within the annular flange 153.

The upper edge of the closure member 154 has one or more downwardly inclined portions 156. Thus, as a thermally responsive actuator member 158 moves the closure member 154 downwardly, initially a very small flow passage is created between the downwardly inclined edge 156 of the closure member 154 and the lower edge surface of the valve seat portion 152, as illustrated in FIG. 9.

FIGS. 10 and 11

FIGS. 10 and 11 show a modification in the valve seat portion of a thermally responsive valve device of this invention. A stationary member 160 is provided with a valve seat portion 162 having an annular flange 164. The inner surface of the annular flange 164 has an inclined wall surface or upwardly sloping portion 165 along at least a part thereof. An actuator member not shown, is attached to a closure member 166 for movement thereof. Initial upward movement of the closure member 166 within the flange 164 provides a very small flow passage along at least a portion of the periphery of the closure member 166, between the sloping portion 165 and the lower edge of the closure member 166. As the closure member 166 moves gradually upwardly, the spacing between the inclined wall surface 165 and the lower edge of the closure member 166 gradually increases and provides a gradually increasing fluid flow passage for flow of fluid between the lower edge of the closure member 166 and the inclined surface 165 of the valve seat portion 162, as illustrated in FIG. 11.

FIGS. 12 and 13

FIGS. 12 and 13 show another modification in the valve seat portion of a thermally responsive valve device of this invention. A stationary member 170 has a valve seat portion 172 provided with an annular flange 173 which has an upwardly curved or arcuate inner surface 174 along at least a portion of the flange 173. A movable closure member 176 is adapted to seat within the valve seat portion 172. As a thermally responsive actuator member, not shown, moves the movable member 176 upwardly, initial movement of the closure member 176 upwardly results in very limited fluid flow, at least at a portion of the lower surface or edge of the closure member 176. As illustrated in FIG. 13, further upward movement of the closure member 176 permits increased fluid flow between the closure member 176 and the valve seat portion 172. Such flow is in a pattern which is different in characteristics from the flow pattern obtained as the closure member 166 moves upwardly with respect to the valve seat 162 in the device shown in FIGS. 10 and 11.

FIGS. 14 and 15

FIGS. 14 and 15 show another modification in the valve seat portion of a thermally responsive valve device of this invention. A stationary member 180 is provided with a valve seat portion 182. The stationary member 180 also has an inclined or tapered entry portion 184 directly below the valve seat portion 182. A movable closure member 186 is adapted to seat within the valve seat portion 182. As the movable closure member 186 moves slightly upwardly from the valve seat portion 182, a very small and controlled fluid flow passage is created between the closure member 186 and the valve seat portion 182. The inclined portion 184 which leads to the valve seat portion 182 provides a type of flow pattern between the closure member 186 and the valve seat portion 182 which is not otherwise obtained.

FIGS. 16–20

Figure 18:
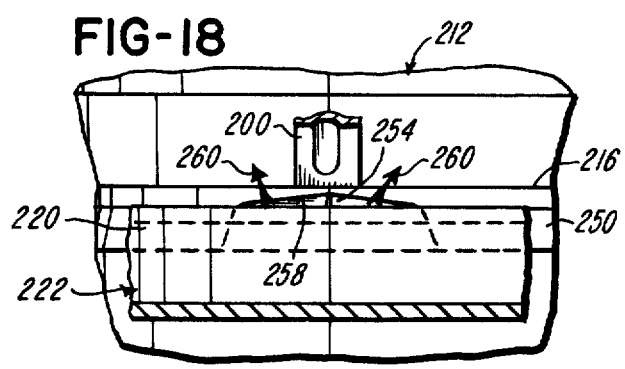
FIG. 18 is a sectional view taken substantially on line 18—18 of FIG. 17.
Figure 17:
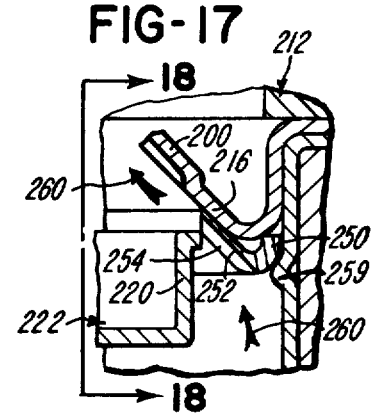
FIG. 17 is an enlarged fragmentary sectional view of a portion of the device as shown in FIG. 16, during opening operation of the valve device.
Figure 20:
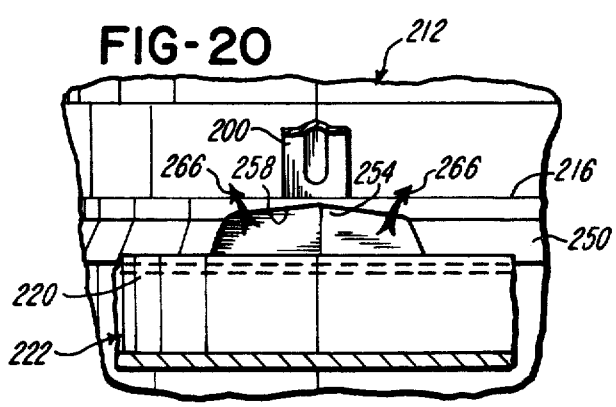
FIG. 20 is a sectional view taken substantially on line 20—20 of FIG. 19.
Figure 19:
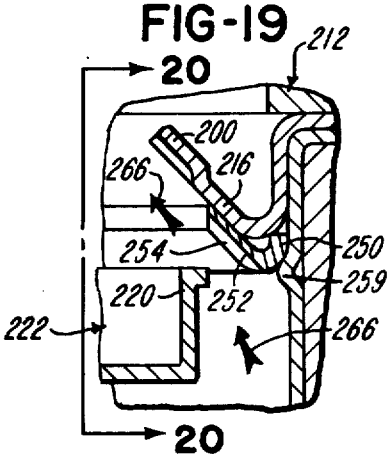
FIG. 19 is fragmentary sectional view similar to FIG. 17, but showing elements of the device during further opening operation of the valve device.

FIGS. 16–20 show another embodiment of the thermally responsive valve device of this invention, which may be generally similar to that shown in U.S. Pat. No. 3,858,800. A support member 200 and a support member 204 have annular flange portions 206 and 208, respectively, which are joined together at the walls of a fluid conduit 212.

The support member 200 has an annular valve seat portion 216, forming a fluid port. The annular valve seat portion 216 is engageable by a flange 220 of a movable valve member or movable closure member 222, to close the fluid port formed by the valve seat portion 216. The movable valve member 222 is attached to a container portion 228 of a thermally responsive actuator 230, of the type discussed above and having thermally responsive actuator material therein. A coil spring 231 encompasses the container portion 228 and engages the support member 204 and the movable closure member 222 and urges the movable closure member 222 toward the valve seat portion 216. The container portion 228 is encompassed by a guide portion 232 of the support member 204 and is axially movable therewithin.

Extending from the container portion 228 is a rod 240. The container portion 228 is movable with respect to the rod 240. The rod 240 is secured to the support member 200.

Attached to the support member 200, integrally or otherwise, is a fluid flow control ring 250 provided with an inclined wall 252 having a plurality of spaced-apart inclined notches 254 in the surface thereof. Each of the notches 254 has sloping upper edge surfaces 258. Herein the ring 250 is shown as being retained in engagement with the annular valve seat portion 216 by a protuberance or rib 259 of the support member 204. Thus, as the movable valve member 222 initially moves from the valve seat portion 216, fluid can flow only through openings formed between the flange 220 and the edge surfaces 258 of the notches 254, as illustrated by arrows 260 in FIGS. 17 and 18. Thus, initially there is only very limited fluid flow. As the movable valve member 222 moves further from the valve seat 216, the notches 254 provide increasingly greater fluid flow, as illustrated by arrows 266 in FIGS. 19 and 20. With increased movement of the movable valve member 222 the flange 220 moves from the notches 254 and there is fluid flow completely past the complete periphery of the flange 220.

SUMMARY

It is to be understood that the vertex in any of the inclined portions or notches discussed above and shown in the drawings may have a definite point, or the vertex may be an extending upper or lower part of the surface which is less definable. The thermally responsive valve device of this invention provides means by which initial fluid flow through a thermally responsive valve device can be controlled and regulated on a predetermined basis to provide non-linear metering of the fluid flow. Such metering or accurate regulation of the fluid flow provides a much more stable temperature control than could otherwise be obtained in a thermally responsive valve device. Furthermore, such accurate fluid flow control and regulation permits great flexibility and possibilities in the modification of total temperature control range of a thermally responsive valve device.

It is also to be understood from the embodiments of this invention as disclosed herein that various types of notches or inclined portions or arcuate portions may be provided on valve seat portions or on closure members in numerous types of thermally responsive valve structures of this invention. Furthermore, the inclined or tapered or arcuate portions which provide a very small opening at initial movement of a closure member, may have various angles, slopes, or inclinations or edge curvature or the like. Furthermore, one or more inclined or curved edge surfaces may be provided in a stationary member and/or in a movable closure member in order to provide fine metering or regulation of fluid flow through more than one opening or a plurality of openings, as an inclined surface or curved surface structure exists in a movable closure member and/or in a stationary closure member. Thus, a thermally responsive valve device of this invention includes structure by which movement of a movable valve member provides a non-linear relationship between the area of the fluid passage created and the distance or length of travel of the movable valve member.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. A thermally responsive fluid flow control valve device for elimination of temperature fluctuations in the fluid during initial opening operation comprising:
   a stationary valve member having an annular valve seat portion forming a fluid port,
   a movable valve member having a closure portion engageable with the annular valve seat portion to close the fluid port, the movable valve member being movable to move the closure portion toward and away from the valve seat portion of the stationary valve member,
   the stationary valve member having an annular flange encompassing the valve seat portion and forming a recess within which the annular valve seat portion is located and within which the closure portion of the movable valve member is movable, the annular flange having a sloping part, initial movement of the movable valve member with respect to the stationary valve member thus creating a small fluid flow passage between the flange and the movable valve member, and increased movement of the closure portion of the movable valve member adjacent the annular flange being non-linear in magnitude with respect to the area of the fluid flow passage created between the annular flange and the movable valve member,
   thermally responsive actuator means,
   means joining the thermally responsive actuator means to the movable valve member for movement thereof.

2. The thermally responsive fluid flow control valve device of claim 1 in which the annular flange has an end surface spaced from the valve seat portion, the end surface having a sloping part.

3. The thermally responsive fluid flow control valve device of claim 1 in which the flange has a sloping wall surface which extends angularly from the valve seat portion.

4. The thermally responsive fluid flow control valve device of claim 1 in which the movable valve member is a hollow cylindrical member.

5. The thermally responsive fluid flow control valve device of claim 1 in which the movable closure member is a substantially flat element.

6. Thermally responsive fluid flow control mechanism of the type having a stationary valve member provided with a wall portion having a cylindrical internal surface, a movable valve member having a cylindrical portion slidably engageable with the cylindrical internal wall surface of the stationary valve member, the improvement wherein the wall portion of the cylindrical portion of the stationary valve member has a notch part so that as the movable valve member moves in a direction from the stationary valve member a small opening is created for fluid flow in the notch part between the movable valve member and the stationary valve member and increased movement of the movable valve member in a direction from the stationary valve member creates a greater opening for fluid flow between the stationary valve member and the movable valve member,
   thermally responsive actuator means,
   and means joining the thermally responsive actuator means to the movable valve member for movement thereof.

7. A thermally responsive fluid flow control valve device for elimination of temperature fluctuation in the fluid during initial opening operation comprising:
   a stationary valve member having an annular valve seat portion forming a fluid port,
   a movable valve member having a closure portion engageable with the valve seat portion to close the fluid port,
   said portions of the valve members being in overlapping relationship, said portion of one of said valve members having an inclined wall surface which extends from the annular valve seat portion, initial movement of the movable valve member in a direction away from the stationary valve member thus creating a small fluid flow passage between said portions of the valve members and increased movement of the movable valve member in a direction from the stationary valve member being non-linear in magnitude with respect to the magnitude of the fluid flow passage created between the said portions of the valve members,
   thermally responsive actuator means,
   means joining the thermally responsive actuator means to the movable valve member for movement thereof.

* * * * *